United States Patent
Liao et al.

(10) Patent No.: US 9,760,969 B2
(45) Date of Patent: Sep. 12, 2017

(54) GRAPHIC PROCESSING SYSTEM AND METHOD THEREOF

(71) Applicant: MEDIATEK INC., Hsin-Chu (TW)

(72) Inventors: Ming-Hao Liao, Hsinchu (TW); Shou-Jen Lai, Hsinchu County (TW); Chia-Hsien Chou, Hsinchu County (TW); Po-Chun Fan, Hsinchu County (TW); Yan-Hong Lu, Hsinchu (TW); Chih-Chung Cheng, Kaohsiung (TW); Hung-Yau Lin, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 207 days.

(21) Appl. No.: 14/641,449

(22) Filed: Mar. 9, 2015

(65) Prior Publication Data
US 2016/0267621 A1 Sep. 15, 2016

(51) Int. Cl.
*G06T 1/20* (2006.01)
(52) U.S. Cl.
CPC ...................................... *G06T 1/20* (2013.01)
(58) Field of Classification Search
None
See application file for complete search history.

(56) References Cited

U.S. PATENT DOCUMENTS

| | | | |
|---|---|---|---|
| 2012/0229481 A1* | 9/2012 | McCrary | G06F 9/5044 345/522 |
| 2013/0247067 A1* | 9/2013 | Schmit | G06F 9/4881 718/105 |
| 2014/0373028 A1* | 12/2014 | Lyashevsky | G06F 11/00 718/106 |

* cited by examiner

*Primary Examiner* — Michelle Chin
(74) *Attorney, Agent, or Firm* — Winston Hsu

(57) ABSTRACT

A graphic processing system and a method of graphic processing are provided. The graphic processing system has a collector, a plurality of slots, a scheduler, an arbiter and at least an arithmetic logic unit (ALU). The collector is configured to group a plurality of workitems into elementary wavefronts. Each of the elementary wavefronts comprises workitems configured to execute the same kernel code. The scheduler is configured to allocate the elementary wavefronts to the slots. Two or more of the elementary wavefronts exist at one slot to form one of a plurality of macro wavefronts. The arbiter is configured to select one of the macro wavefronts. The ALU is configured to execute workitems of at least an elementary wavefront of the selected macro wavefront and output results of execution of the workitems.

18 Claims, 6 Drawing Sheets

GRAPHIC PROCESSING SYSTEM AND METHOD THEREOF

BACKGROUND

The present invention relates to a graphic processing system and a method thereof, and more particularly, to a graphic processing system and a method thereof for executing workitems with a great utilization rate of at least an arithmetic logic unit (ALU) and high effectiveness of accessing data of the workitems.

Graphics processing units (GPU) generally comprise multiple compute units that are ideally suited for executing the same instruction on parallel data streams, as in the case of a single instruction multiple data (SIMD) device, or in data-parallel processing. In many computing models, a central processing unit (CPU) functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on the GPU. One or more of the computation cores of multi-core CPUs or GPUs can be part of the same die or, alternatively, indifferent dies. Recently, hybrid cores having characteristics of both CPU and GPU have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets.

SUMMARY

It is an objective of the claimed invention to provide a graphic processing system and a method thereof for executing workitems with a great utilization rate of at least an arithmetic logic unit (ALU).

It is another objective of the claimed invention to provide a graphic processing system and a method thereof for executing workitems with high effectiveness of accessing data of the workitems.

It is another objective of the claimed invention to provide a graphic processing system and a method thereof for executing workitems with a great utilization rate of ALU and high effectiveness of accessing data of the workitems.

In an embodiment of the present invention, a graphic processing system is provided. The graphic processing system has a collector, a scheduler, an arbiter and an arithmetic logic unit (ALU). The collector is configured to group a plurality of workitems into elementary wavefronts. Each of the elementary wavefronts comprises workitems configured to execute the same kernel code. The scheduler is configured to allocate the elementary wavefronts to the slots. At least two elementary wavefronts exist at one slot to form one of a plurality of macro wavefronts. The arbiter is configured to select one of the macro wavefronts, and the ALU is configured to execute workitems of at least an elementary wavefront of the selected macro wavefront and output results of execution of the workitems.

In an embodiment of the present invention, a method of graphic processing is provided. The method comprises steps of: grouping a plurality of workitems into elementary wavefronts, wherein each of the elementary wavefronts comprises workitems configured to execute the same kernel code; allocating the elementary wavefronts to a plurality of slots to form a plurality of macro wavefronts, wherein at least two elementary wavefronts exist at one slot to form one of the macro wavefronts; selecting one of the macro wavefronts; executing workitems of at least an elementary wavefront of the selected macro wavefront; and outputting results of execution of the workitems.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
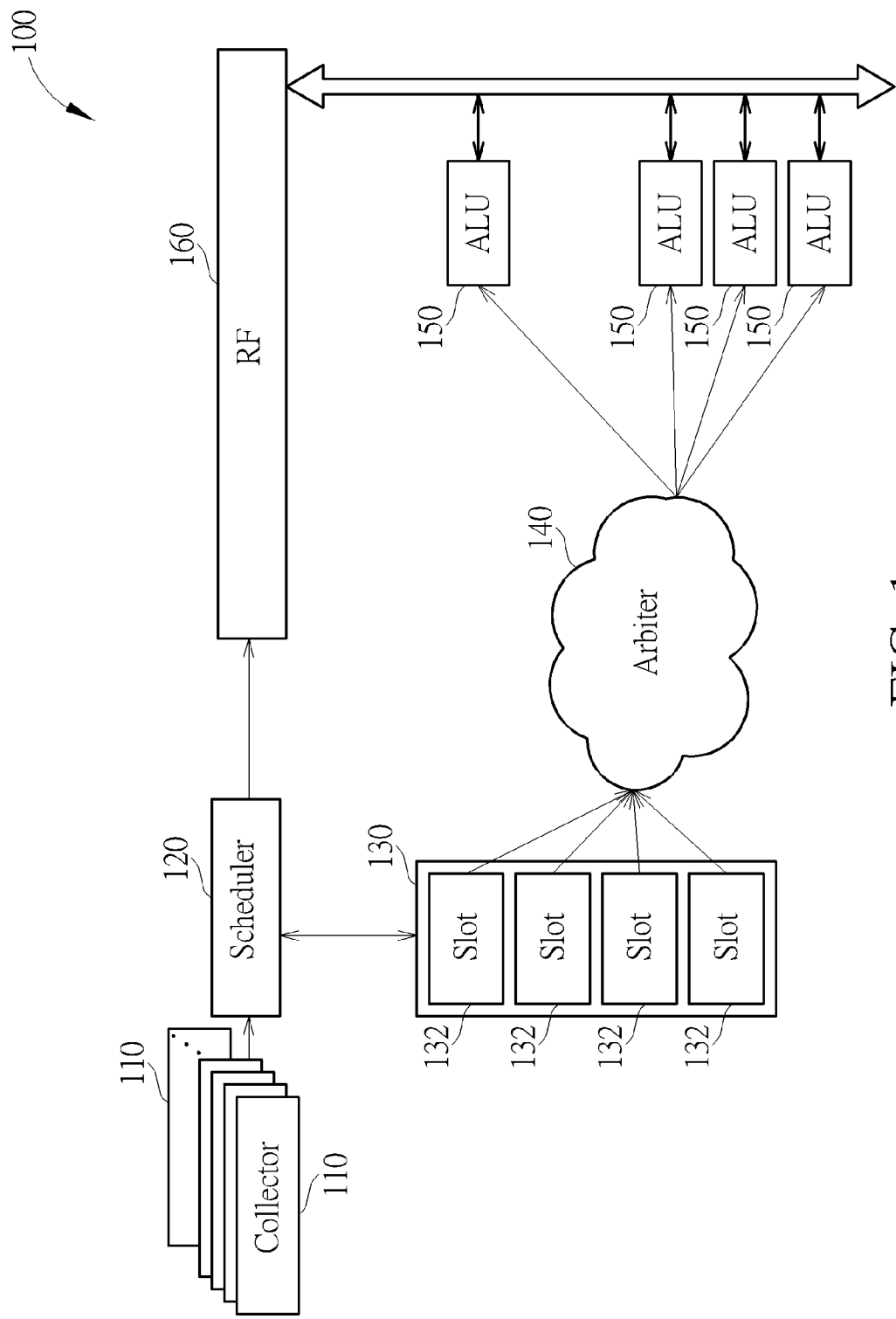
FIG. 1 is a schematic diagram of a graphic processing system according to an embodiment of the present invention.

While the embodiments are described herein are for particular applications, it should be understood that the disclosed embodiments are not limited thereto. Those skilled in the art with access to the teachings provided herein will recognize additional modifications, applications, and embodiments within the scope thereof and additional fields in which the disclosed embodiments would be of significant utility.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Embodiments may be used in any graphic processing system, computer system, computing device, entertainment system, media system, game systems, communication device, personal digital assistant, or any system using one or more processors. Each of these computer systems may comprise a heterogeneous computing system. A "heterogeneous computing system," as the term is used herein, is a computing system in which multiple kinds of processors are available.

In a GPU, workitems assigned to a single compute unit are referred to as a "workgroup". Two or more workitems that are issued for execution in parallel is an "elementary wavefront". A macro wavefront may comprise one or more elementary wavefronts. A workgroup may comprise one or more macro wavefronts. More detail about the relationship between the macro wavefronts and the elementary wavefronts will be explained later. Moreover, although embodiments are primarily described in relation to scheduling workitems of a workgroup, the teachings of this disclosure may be applied to schedule workitems across anyone or more processors and/or groups of processes that have access to a shared memory. The term "kernel code", as used herein, refers to a program and/or processing logic that is executed as one or more workitems in parallel having the same code base. It should be noted that, in some embodiments, the terms "workitem", "thread" and "lane" are interchangeable. The interchangeability, in this disclosure, of "workitem", "thread" and "lane" is illustrative, for example, of the flexible simulated or true independence of workitem execution embodied in the model in embodiments. As execution proceeds, the workgroups in the grid are distributed to arithmetic logic units (ALUs). All workitems of a workgroup are executed on the same arithmetic logic unit (ALU) at the same time, each workitem running the kernel code. As defined herein, a workitem is one of a collection of parallel executions of a kernel invoked on a device by a command. A workitem is executed by one compute unit as part of a workgroup executing on an arithmetic logic unit (ALU). A workitem is distinguished from other executions within the collection by its global identification (ID) and local ID.

Figure 2:
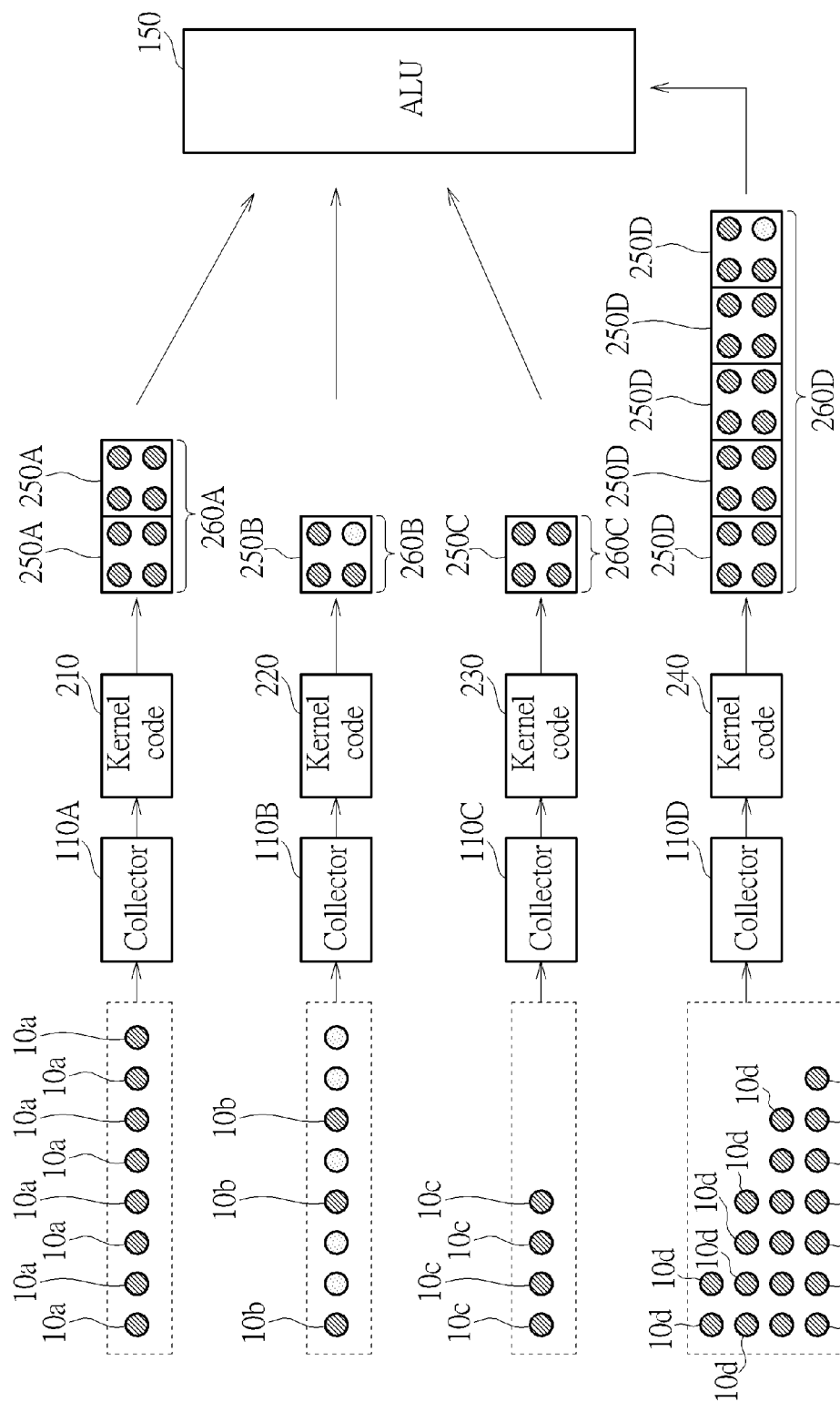
FIG. 2 illustrates the data flow of the graphic processing system in FIG. 1.

Please refer to FIGS. 1 and 2. FIG. 1 is a schematic diagram of a graphic processing system 100 according to an embodiment of the present invention, and FIG. 2 illustrates the data flow of the graphic processing system 100 in FIG. 1. The graphic processing system 100 may be a heterogeneous computing system. The graphic processing system 100 has collectors 110, a plurality of slots 132 of scheduling resources 130, a scheduler 120, an arbiter 140 and at least an arithmetic logic unit (ALU) 150. The collectors 110 are configured to group a plurality of workitems (such as vertex, fragment, compute workitems and others, and are illustrated as 10a, 10b, 10c and 10d in FIG. 2) into elementary wavefronts (e.g. 250A to 250D). In the embodiment, each of the elementary wavefronts has four workitems. However, the present invention is not limited thereto. In other words, a single elementary wavefront may comprise less or more workitems.

All of the workitems of each elementary wavefront are configured to execute the same kernel code. For example, four collectors 110A, 110B, 110C and 110D of the collectors 110 are illustrated in FIG. 2. Each of the two elementary wavefronts 250A of the macro wavefront 260A comprises workitems 10a which are collected by the collector 110A and are configured to execute the first kernel code 210. The elementary wavefront 250B of the macro wavefront 260B comprises workitems 10b which are collected by the collector 110B and are configured to execute the second kernel code 220. The elementary wavefront 250C of the macro wavefront 260C comprises workitems 10c which are collected by the collector 110C and are configured to execute the third kernel code 230. Each of the five elementary wavefronts 250D of the macro wavefront 260D comprises workitems 10d which are collected by the collector 110D and are configured to execute the fourth kernel code 240.

It is noted that one input collector can be arranged to collect different types of workitems, and thus the collection results generated by the input collector can be processed by different types of kernel codes and allocated to different slots.

In an embodiment of the present invention, the first kernel code 210, the second kernel code 220, the third kernel code 230 and the fourth kernel code 240 are different from each other. In other words, the programs related to the workitems 10a to 10d are different from each other. Moreover, workitems configured to execute the same kernel code may be divided into two or more the macro wavefronts by a single collector 110, and the two or more the macro wavefronts may be allocated to different slots 132 by the scheduler 120.

In an embodiment of the present invention, each of the collectors 110 is configured to group a plurality of workitems configured to execute the same kernel code. For example, one of the collectors 110 is configured to group the workitems 10a, which are configured to execute the first kernel code 210, to form the elementary wavefronts 250A. One of the collectors 110 is configured to group the workitems 10b, which are configured to execute the second kernel code 220, to form the elementary wavefront 250B. One of the collectors 110 is configured to group the workitems 10c to form the elementary wavefront 250C, and one of the collectors 110 is configured to group the workitems 10d to form the elementary wavefronts 250D.

In an embodiment of the present invention, the graphic processing system 100 may comprise a single collector 110, and the single collector 110 is configured to group the workitems into the elementary wavefronts.

A group of the elementary wavefront (s) allocated to a single slot 132 is called a "macro wavefront". In other words, a macro wavefront may comprise one or more elementary wavefronts. For example, a macro wavefront 260A is composed of the two elementary wavefronts 250A, a macro wavefront 260B is composed of the elementary wavefront 250B, a macro wavefront 260C is composed of the elementary wavefront 250C, and a macro wavefront 260D is composed of the five elementary wavefronts 250D. In an embodiment of the present invention, each of the slots 132 is a module that contains an instruction buffer, a program counter and a memory that records related states of the workitems of the macro wavefront (or elementary wavefront (s)) allocated thereto. A macro wavefront should occupy one of the slots 132 before it can join the arbitration of arbiter 140. All workitems of a macro wavefront share a single program counter. Workitems inside an elementary wavefront of a macro wavefront are executed together.

The scheduler 120 is configured to allocate the elementary wavefronts to the slots 132 to form a plurality of macro wavefronts. In the present invention, two or more of the elementary wavefronts may be allocated to one of the slots 132 concurrently to form a macro wavefront. The arbiter 140 is configured to select one of the macro wavefronts which are allocated to the slots 132. Each of the ALUs 150 is configured to execute workitems of at least an elementary wavefront of the selected macro wavefront and output results of the execution of the workitems of the at least an elementary wavefront of the selected macro wavefront. In an embodiment of the present invention, the arbiter 140 is configured to select one of the macro wavefronts which are allocated to the slots 132 according to priority of the slots 132. When the scheduler 120 allocates the elementary wavefronts to the slots 132, the states of the slots 132 are set by the scheduler 120. The arbiter 140 selects the elementary wavefront for execution according to the states of the slots 132. If the state of a slot 132 indicates that the slot 132 is not ready, the arbiter 140 would not select any elementary wavefront from the slot 132. In other words, only the elementary wavefront (s) allocated to the slot (s) 132 set ready for execution has chance to be selected by the arbiter 140.

Moreover, when a slot 132 is not set ready, one or more following elementary wavefronts from the collectors 110 may be allocated by the scheduler 120 to the slot 132 until the slot 132 is set ready. The collectors 110 would inform the scheduler 120 whether there is any following elementary wavefront, and the scheduler 120 allocates the following elementary wavefront(s) to the slot(s) 132 which is not set ready. When a slot 132 is not ready, a corresponding collector 110 keeps grouping workitems, which are configured to execute the same kernel, into elementary wavefronts, and the scheduler 120 keeps receiving the elementary wavefronts from the collector 110 and attaching the elementary wavefronts to the slot 132. Once a slot 132 is set ready by the scheduler 120, a macro wavefront composed of the elementary wavefront(s) allocated to the slot 132 is formed. Moreover, when the slot 132 is not ready, one or more elementary wavefronts are allowable to be attached to the slot 132. Since one or more elementary wavefronts may be allocated to a non-ready slot 132, a macro wavefront may comprise one or more elementary wavefronts. If a macro wavefront comprises a plurality elementary wavefronts, the elementary wavefronts of the macro wavefront would be sequentially selected by the arbiter 140 for execution.

Additionally, a total number of the collectors 110 may be different from a total number of the slots 132. For example, two or more macro wavefronts generated by a collector 110 may be respectively allocated to two or more non-ready slots 132 for execution. In other words, a single collector 110 may divide workitems configured to execute the same kernel code into two or more the macro wavefronts, and the two or more the macro wavefronts would be allocated to different slots 132 by the scheduler 120. Since the scheduler 120 handles the allocations of the macro wavefronts, the total number of the collectors 110 may be different from the total number of the slots 132. However, since the total number of the collectors 110 and the total number of the slots 132 are determined according to the specification of the graphic processing system 100, the total number of the collectors 110 may be the same as the total number of the slots 132 in another embodiment of the present invention for a specific specification of the graphic processing system 100.

Figure 3:
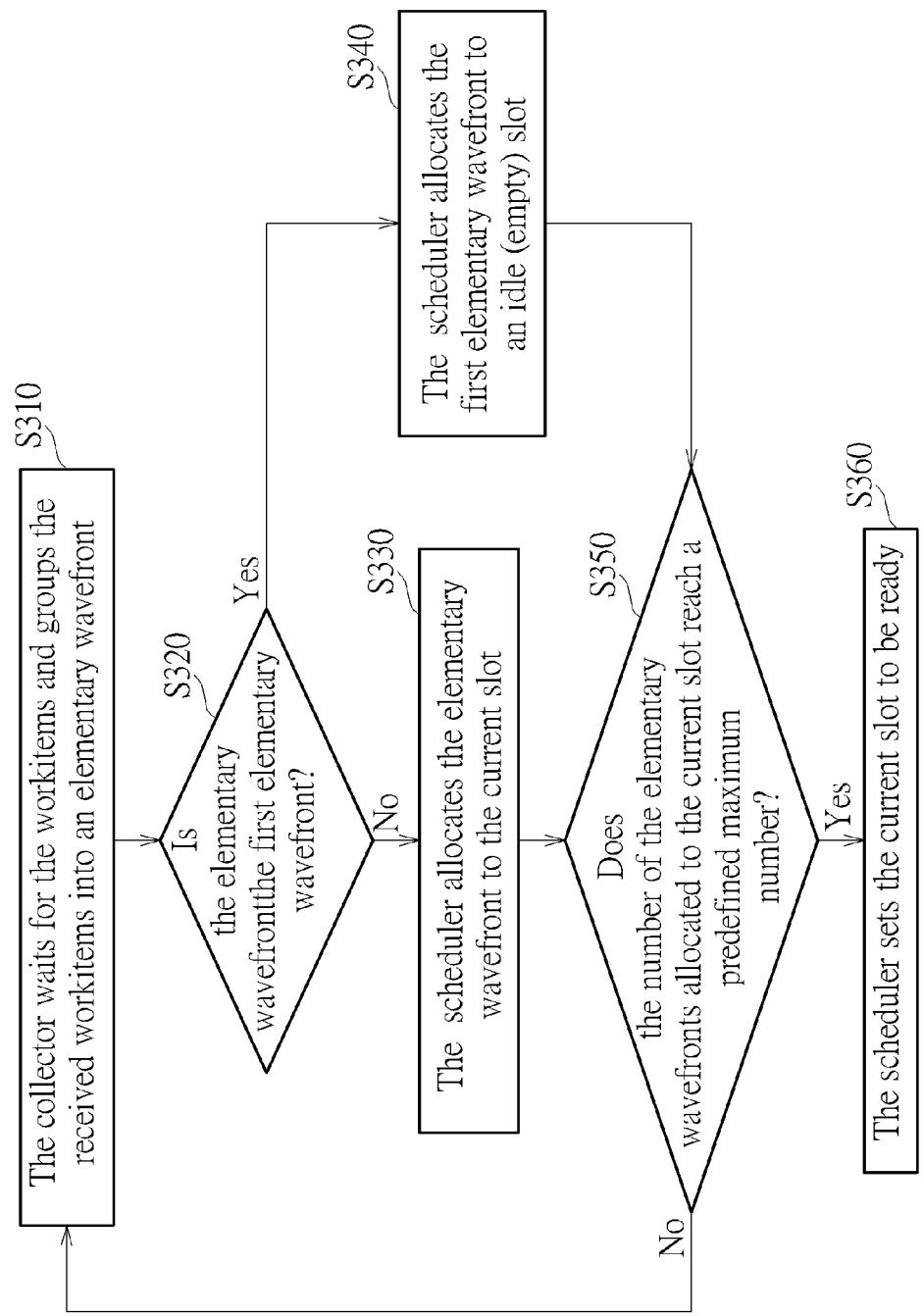
FIGS. 3-5 are flow charts respectively illustrate the conditions that a slot would be set ready according to different embodiments of the present invention.
Figure 4:
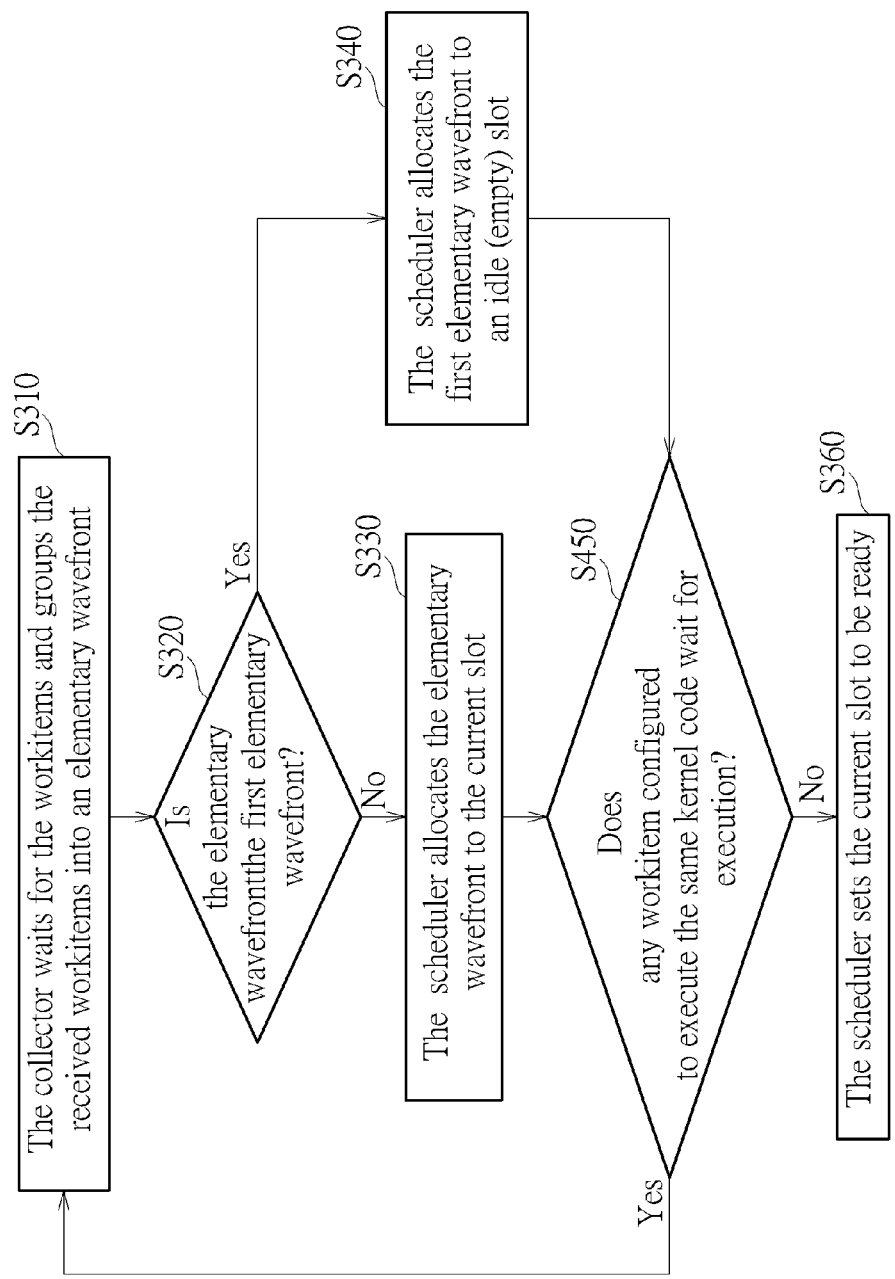
Figure 5:
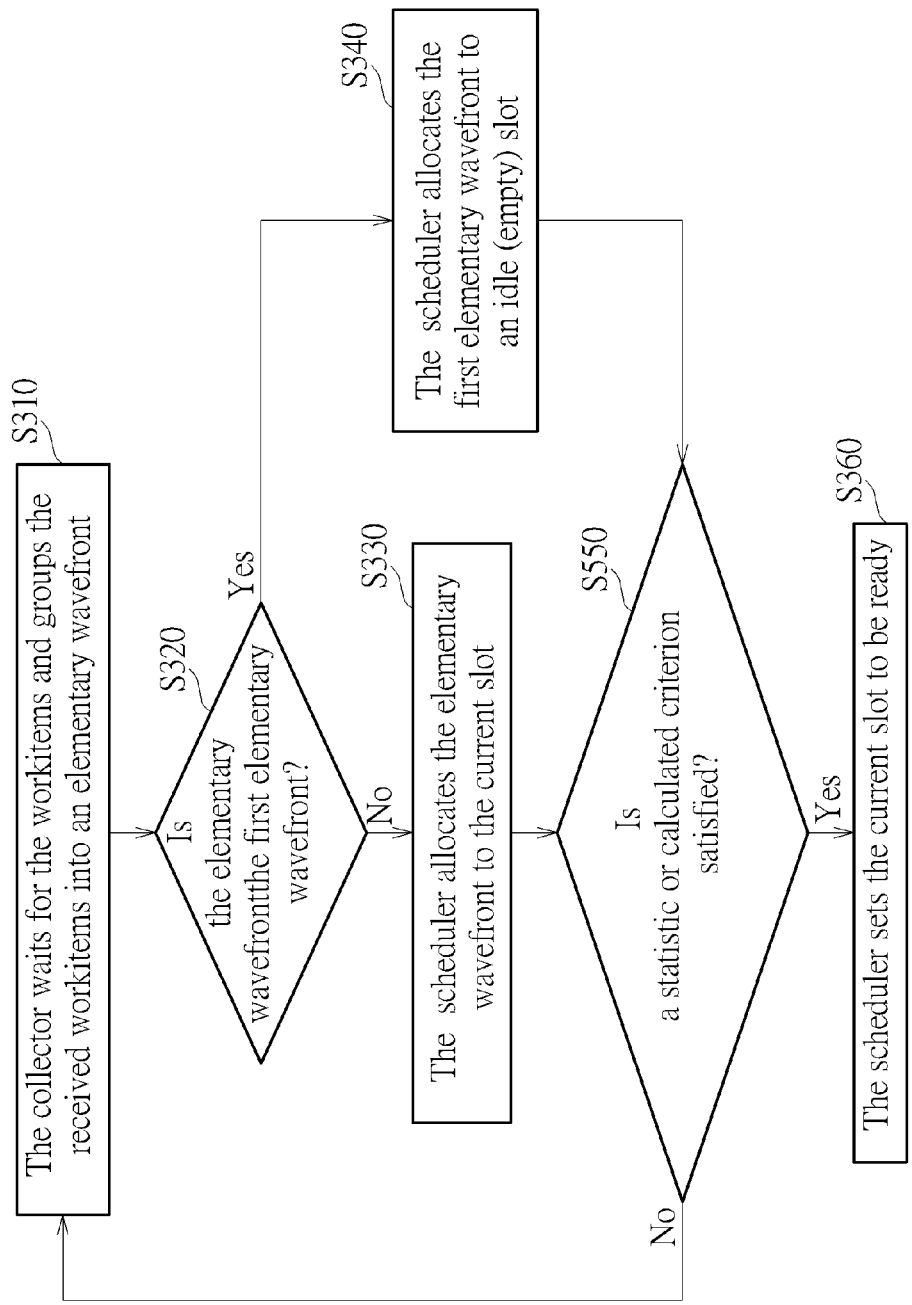

In some conditions, a slot 132 would be set ready. Please refer to FIGS. 3 to 5. FIGS. 3-5 are flow charts respectively illustrate the conditions that a slot would be set ready according to different embodiments of the present invention. In Step 310, the collector 110 waits for the workitems and groups the received workitems into an elementary wavefront. In Step 320, the scheduler 120 determines whether the elementary wavefront is the first elementary wavefront. If the elementary wavefront is the first elementary wavefront, Step S340 would be executed. Otherwise, Step S330 would be executed. In Step 340, the scheduler 120 allocates the first elementary wavefront to an idle (i.e. empty) slot 132, that there is no elementary wavefront has been attached thereto, and sets the idle slot 132 to be a current slot. In Step S330, the scheduler 120 allocates the elementary wavefront to the current slot 132.

In Step S350, the scheduler 120 determines whether the number of the elementary wavefronts allocated to the current slot reach a predefined maximum number? If the number of the elementary wavefronts allocated to the current slot 132 reaches the predefined maximum number, Step S360 is executed, such that the scheduler 120 sets the current slot 132 to be ready. Otherwise, Step S310 would be repeated. In the embodiment, since the current slot 132 is set ready once the number of the elementary wavefronts allocated to the current slot 132 reaches the predefined maximum number, the number of elementary wavefront in a macro wavefront is fixed and equal to the predefined maximum number. Different from the embodiment shown in FIG. 4, the number of a macro wavefront is variable in other embodiments of the present invention. Please refer to FIG. 4. Step S450 in FIG. 4 replaces Step S350 in FIG. 3. In Step S450, the collector 110 informs the scheduler 120 whether any workitem, which is configured to execute the same kernel code as that executed by the workitems allocated to the current slot 132, is waiting for execution. If there is no workitem for execution, Step S360 is executed. Otherwise, Step S310 would be repeated.

In the embodiment, since the current slot 132 is set ready once there is no workitem is queuing in the collector 110 for execution, the number of elementary wavefront in a macro wavefront is variable. In other embodiments of the present invention, the scheduler 120 may set the current slot 132 to be ready according to predetermined criteria. Please refer to FIG. 5. Step S550 in FIG. 5 replaces Step S350 in FIG. 3. In Step S550, the scheduler 120 determines whether a statistic or calculated criterion is satisfied. The statistic or calculated criterion may be that, for example, a defined timeout is exceeded or that the loading of the ALU 150 reaches a threshold set by the user. Once the statistic or calculated criterion is satisfied, Step 360 is executed to set the current slot 132 to be ready. Otherwise, Step S310 would be repeated.

Basically, the arbiter 140 selects a macro wavefront for execution from the slots 132 according to priority and availability of the slots 132. Moreover, there are many possible variations of executions of workitems of a plurality of elementary wavefronts when two or more elementary wavefronts are allocated in a single slot 132. For example, in an embodiment of the present invention, workitems of all elementary wavefronts of a macro wavefront are executed without interrupt, and no other macro wavefront would be selected for execution until the executions of current instruction of the workitems of all elementary wavefronts of the current executed macro wavefront have been finished. In other words, even though a macro wavefront is allocated to a slot 132 with higher priority, the macro wavefront allocated to the slot 132 with higher priority would not be selected for execution until the executions of current instruction of the workitems of all elementary wavefronts of the current executed macro wavefront have been finished.

In another embodiment of the present invention, a macro wavefront allocated to a slot 132 with higher priority would interrupt the executions of the current executed macro wavefront. Thus, the ALU 150 may instantly execute the workitems of the macro wavefront allocated to the slot 132 with higher priority, and the executions of the macro wavefront allocated to the slot 132 with lower priority are paused. In another embodiment of the present invention, executions of a macro wavefront having workitems configured to execute any instruction of memory accessing would not be interrupt by a macro wavefront allocated to a slot 132 with higher priority until the instruction of memory accessing have been executed, and executions of a macro wavefront without workitems configured to execute any instruction of memory accessing may be interrupted at any time by a macro wavefront allocated to a slot 132 with higher priority.

A workitem (e.g. 10a to 10d) is also known as a thread, a lane, a shader invocation and an instance. In one illustrative embodiment, each arithmetic logic unit 150 (e.g., SIMD processing core) can execute a respective instantiation of a particular workitem to process incoming data. In one example, a workitem is one of a collection of parallel executions of kernel code invoked on a device by a command. A workitem is executed by a compute unit as part of a workgroup executing on an arithmetic logic unit (ALU) 150. A workitem is distinguished from other executions within the collection by its global ID and local ID. In an embodiment of the present invention, a subset of workitems in a workgroup that execute simultaneously together on a single ALU 150 can be referred to as an elementary wavefront. All elementary wavefronts from a workgroup are processed on the same ALU 150. Instructions across an elementary wavefront are issued one at a time, and when all workitems follow the same control flow, each workitem executes the same program.

All of the workitems of each of the elementary wavefronts are executed by an ALU 150 at the same time. For example, the workitems 10*a* of each of the elementary wavefronts 250A would be executed by the ALU 150 at the same time; the workitems 10*b* of the elementary wavefront 250B would be executed by the ALU 150 at the same time; the workitems 10*c* of the elementary wavefront 250C would be executed by the ALU 150 at the same time; and the workitems 10*d* of each of the elementary wavefronts 250D would be executed by the ALU 150 at the same time. When the ALU 150 finishes the executions of all instructions of the workitems of the selected macro wavefront, the slot occupied by the selected macro wavefront is released such that the slot could be used by succeeding macro wavefronts.

As shown in FIG. 2, a macro wavefront 260A formed by two elementary wavefronts 250A is illustrated. In an embodiment of the present invention, all of the workitems 10*a* of the elementary wavefronts 250A take the same control flow of the first kernel code 210. In another embodiment of the present invention, the workitems 10*a* of the elementary wavefronts 250A may take different control flows of the first kernel code 210. For example, all of the workitems 10*a* of one of the elementary wavefronts 250A take a first control flow of the first kernel code 210, all of the workitems of another elementary wavefront 250A take a second control flow of the first kernel code 210, and the first control flow is different from the second control flow. On Heterogeneous System Architecture (HAS) components with a wavefront size greater than 1, control flow operations can introduce a performance issue called divergent control flow. When an elementary wavefront executes a branch that can transfer to multiple targets (namely a conditional branch "cbr" or switch branch "sbr", see Chapter 8 Branch Operations of HSA Programmer's Reference Manual Version 1.0 (p. 231)), or a function call that can invoke multiple functions (namely a switch call "scall" or indirect call "icall", see Chapter 10 Function Operations of HSA Programmer's Reference Manual Version 1.0 (p. 253)), it is possible that the workitems in the elementary wavefront take different paths. This causes the elementary wavefront to enter divergent control flow. Moreover, if a kernel code executed by an elementary wavefront has different control flows and all workitems of the elementary wavefront take the same control flow of the kernel code, all workitems of the elementary wavefront would pass over the rest control flows of the kernel code since the rest control flows of the kernel code would not be taken by any workitem of the elementary wavefront. Accordingly, the effectiveness of parallel executions of the workitems of the elementary wavefront may be improved since the rest control flows of the kernel code are passed over.

Since each of the elementary wavefronts has four workitems in the embodiment, the size of a single elementary wavefront is four. If an elementary wavefront has four workitems, the elementary wavefront is fully filled (e.g. the elementary wavefront 250A). If an elementary wavefront has workitems less than 4, the elementary wavefront is partially filled (e.g. the elementary wavefront 250B). The utilization rate of the ALU 150 is related to the total number of the elementary wavefronts that are partially filled. The less the total number, the greater the utilization rate of the ALU 150. If the size of a single elementary wavefront is set to be a smaller number, the total number of the elementary wavefronts being partially filled may be reduced, thus the utilization rate of the ALU 150 may be increased by using a smaller size of a single elementary wavefront.

In addition, since two or more of the elementary wavefronts may be allocated to one of the slots 132 concurrently, and all workitems of the elementary wavefronts allocated to a single slot 132 are configured to execute the same kernel code, data locality (temporal locality and/or spatial locality) related to the workitems of the two or more of the elementary wavefronts in a single macro wavefront is good enough for good performance of executions of the elementary wavefronts. Accordingly, the effectiveness of accessing the data of the workitems may be improved.

Figure 6:
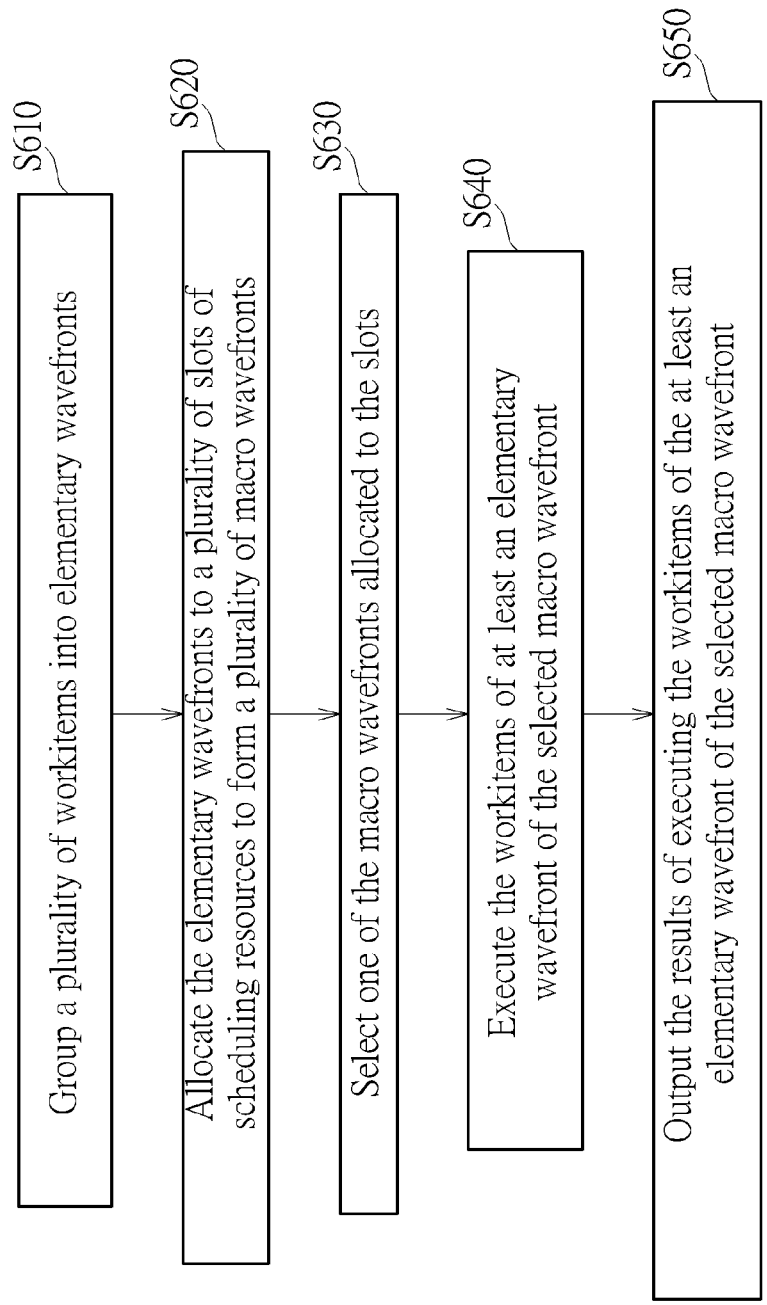
FIG. 6 is a flow chart of the method of graphic processing according to an embodiment of the present invention.

Please refer to FIG. 6. FIG. 6 is a flow chart of the method of graphic processing according to an embodiment of the present invention. The method shown in FIG. 6 can be applied to the graphic processing system 100 shown in FIG. 1. The method can be described as follows. In Step S610, the collectors 110 group a plurality of workitems (e.g. 10*a* to 10*d*) into elementary wavefronts (e.g. 250A to 250D). Each of the elementary wavefronts comprises workitems configured to execute the same kernel code. In Step S620, the scheduler 120 allocates the elementary wavefronts to a plurality of slots 132 of the scheduling resources 130 to forma plurality of macro wavefronts. Two or more of the elementary wavefronts may be allocated to one of the slots concurrently to form one of the macro wavefronts. In Step S630, the arbiter 140 selects one of the macro wavefronts which are allocated to the slots 132. In Step S640, one of the ALUs 150 executes the workitems of at least an elementary wavefront of the selected macro wavefront. In Step S650, the ALU 150 outputs the results of the execution of the workitems of the at least an elementary wavefront of the selected macro wavefront.

In the embodiments of the present invention, two or more of the elementary wavefronts may be concurrently allocated to one of the slots to form a macro wavefront, and all workitems of the elementary wavefronts allocated to a single slot 132 are configured to execute the same kernel code. Accordingly, data locality related to the workitems of the two or more of the elementary wavefronts in a macro wavefront may be good enough for good performance of executions of the elementary wavefronts, and the effectiveness of accessing the data of the workitems may be improved. Moreover, the utilization rate of the ALU may be increased by using a smaller size of a single elementary wavefront.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A graphic processing system, comprising:
 a collector, configured to group a plurality of workitems into elementary wavefronts, wherein each of the elementary wavefronts comprises workitems configured to execute the same kernel code;

a scheduler, configured to allocate the elementary wavefronts to a plurality of slots, wherein at least two of the elementary wavefronts exist at one slot to form one of a plurality of macro wavefronts;

an arbiter, configured to select one of the macro wavefronts; and an arithmetic logic unit (ALU), configured to execute workitems of at least an elementary wavefront of the selected macro wavefront and output results of execution of the workitems.

2. The processing system of claim 1, wherein all workitems of each of the elementary wavefronts are executed by the at least an arithmetic logic unit at the same time.

3. The processing system of claim 1, wherein the selected macro wavefront is allocated to one of the slots and comprises at least two first elementary wavefronts, and all workitems of the at least two first elementary wavefronts are configured to execute a first kernel code.

4. The processing system of claim 1, wherein a first macro wavefront is allocated to a first slot of the slots, a second macro wavefront is allocated to a second slot of the slots, the first macro wavefront has a plurality of workitems configured to execute a first kernel code, the second macro wavefront has a plurality of workitems configured to execute a second kernel code, and the first kernel code is different from the second kernel code.

5. The processing system of claim 1, wherein a first macro wavefront is allocated to a first slot of the slots, a second macro wavefront is allocated to a second slot of the slots, the first macro wavefront has a plurality of workitems configured to execute a first kernel code, the second macro wavefront has a plurality of workitems configured to execute a second kernel code, and the first kernel code is the same as the second kernel code.

6. The processing system of claim 1, wherein multiple elementary wavefronts are allocated to one of the slots to form one of the macro wavefronts, and all workitems of the multiple elementary wavefronts are configured to execute a first kernel code.

7. The processing system of claim 6, wherein all workitems of one of the multiple elementary wavefronts take a first control flow of the first kernel code, all workitems of another elementary wavefront of the multiple elementary wavefronts take a second control flow of the first kernel code, and the first control flow is different from the second control flow.

8. The processing system of claim 1, wherein the at least an arithmetic logic unit comprises a plurality of arithmetic logic units, and all workitems of each of the elementary wavefronts are scheduled to be executed by one of the arithmetic logic units simultaneously.

9. The processing system of claim 1, wherein the arbiter is configured to select one of the macro wavefronts which are allocated to the slots according to priority of the slots.

10. A method of graphic processing, comprising:
grouping a plurality of workitems into elementary wavefronts, wherein each of the elementary wavefronts comprises workitems configured to execute the same kernel code;

allocating the elementary wavefronts to a plurality of slots, wherein at least two of the elementary wavefronts exist at one slot to form one of a plurality of macro wavefronts;

selecting one of the macro wavefronts allocated to the slots;

executing workitems of at least an elementary wavefront of the selected macro wavefront; and outputting results of execution of the workitems.

11. The method of claim 10, wherein all workitems of each of the elementary wavefronts are executed by an arithmetic logic unit (ALU) at the same time.

12. The method of claim 10, wherein the selected macro wavefront is allocated to one of the slots and comprises at least two first elementary wavefronts, and all workitems of the at least two first elementary wavefronts are configured to execute a first kernel code.

13. The method of claim 10, wherein a first macro wavefront is allocated to a first slot of the slots, a second macro wavefront is allocated to a second slot of the slots, the first macro wavefront has a plurality of workitems configured to execute a first kernel code, the second macro wavefront has a plurality of workitems configured to execute a second kernel code, and the first kernel code is different from the second kernel code.

14. The method of claim 10, wherein a first macro wavefront is allocated to a first slot of the slots, a second macro wavefront is allocated to a second slot of the slots, the first macro wavefront has a plurality of workitems configured to execute a first kernel code, the second macro wavefront has a plurality of workitems configured to execute a second kernel code, and the first kernel code is the same as the second kernel code.

15. The method of claim 10, wherein multiple elementary wavefronts are allocated to one of the slots to form one of the macro wavefronts, and all workitems of the multiple elementary wavefronts are configured to execute a first kernel code.

16. The method of claim 15, wherein all workitems of one of the multiple elementary wavefronts take a first control flow of the first kernel code, all workitems of another elementary wavefront of the multiple elementary wavefronts take a second control flow of the first kernel code, and the first control flow is different from the second control flow.

17. The method of claim 10, wherein all workitems of each of the elementary wavefronts are scheduled to be executed simultaneously by an arithmetic logic unit (ALU).

18. The method of claim 10, wherein the selected macro wavefront is selected according to priority of the slots.

* * * * *